United States Patent
Karach et al.

(10) Patent No.: US 10,237,195 B1
(45) Date of Patent: Mar. 19, 2019

(54) IP VIDEO PLAYBACK

(71) Applicant: Cox Communications, Inc., Atlanta, GA (US)

(72) Inventors: Slavisha Karach, Alpharetta, GA (US); Sung Hoon Yun, Atlanta, GA (US); Muhammad Asif Raza, McDonough, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 677 days.

(21) Appl. No.: 14/711,376

(22) Filed: May 13, 2015

(51) Int. Cl.
*H04L 12/835* (2013.01)
*H04L 29/06* (2006.01)

(52) U.S. Cl.
CPC .............. *H04L 47/30* (2013.01); *H04L 65/60* (2013.01)

(58) Field of Classification Search
CPC ....... H04L 65/80; H04L 67/325; H04L 47/28; H04L 47/30; H04L 65/60
See application file for complete search history.

(56) References Cited

U.S. PATENT DOCUMENTS

| | | | | | |
|---|---|---|---|---|---|
| 6,018,359 | A * | 1/2000 | Kermode | ........... | H04N 21/2381 348/E5.008 |
| 6,721,796 | B1 * | 4/2004 | Wong | ..................... | H04L 47/29 370/395.4 |
| 6,728,410 | B1 * | 4/2004 | Fukunaga | ............... | G06T 9/007 375/240.03 |
| 7,143,433 | B1 * | 11/2006 | Duan | ............... | H04N 21/23103 711/114 |
| 7,337,231 | B1 * | 2/2008 | Li | ......................... | H04L 1/0006 709/231 |

\* cited by examiner

*Primary Examiner* — Daniel C. Murray
*Assistant Examiner* — Kristoffer L S Sayoc
(74) *Attorney, Agent, or Firm* — Merchant & Gould

(57) ABSTRACT

An improved IP video playback system for quicker access and better user experience during IP video playback is provided. Aspects of the IP video playback system allow a content service provider to provide quicker access to requested content items. When a user requests access to content items, an analysis is performed to calculate the lengths of time in which a portion of the content item can be downloaded, cached, and displayed and the corresponding size of that portion. The analysis may be based on various parameters. Once the analysis is performed and the portion is downloaded, playback may begin and the process may be repeated as necessary with increasing portion sizes until a predetermined portion size is reached, the user indicates a content switch, or the content item has been fully downloaded.

20 Claims, 7 Drawing Sheets

IP VIDEO PLAYBACK

BACKGROUND

The increasing power and flexibility of Internet Protocol (IP) devices has allowed a growing number of users to access various content items from those IP devices. Further, users may subscribe to a plurality of service providers providing several options for media content. When users wish to access content items from IP devices, a software client on the device typically makes a request to download the content item from a server where the content item resides. Content items are divided into segments of a standard time length when downloaded from a server. Before the content item can be provided on the requesting IP device, there is often a wait time as a buffer is built as segments are downloaded, which may be indicated to users by a circling icon, an hour glass, black screen, etc. This wait time varies depending on parameters such as: quality of the content item, screen size, download speed, etc.

Further, users are not limited to a single content item; users can switch from one content item to another. Typically, several sequential segments are downloaded into a cache before a requested content item is displayed. As is known in the industry, a segment is a portion of a content item of approximately ten seconds worth of playback. Typically, one segment is downloaded at a time and several segments may be cached. When users decide to switch to new content items, the cached segments of the original content item are discarded and segments of the newly requested content item are then cached before the newly requested content item is provided to the users, which requires users to wait as the cache is built. The waiting associated with switching content items leads to a frustrating viewing experience, particularly if the users frequently switch from one content item to another.

It is with respect to these and other considerations that aspects of the present disclosure will be made.

SUMMARY

Aspects of the present disclosure provide for better viewing experience for a user during IP video playback. Aspects of the IP video playback system allow a content service provider to provide users quicker display of requested content items. When users request access to content items, an analysis is performed to calculate the lengths of time in which a portion of the content item can be downloaded, cached, and displayed and the corresponding size of that portion. The analysis may be based on various parameters. Once the analysis is performed and the portion is downloaded, playback may begin and the process may be repeated as necessary with increasing portion sizes until a predetermined portion size is reached, the users indicate a content switch, or the content item has been fully downloaded.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Figure 1A:
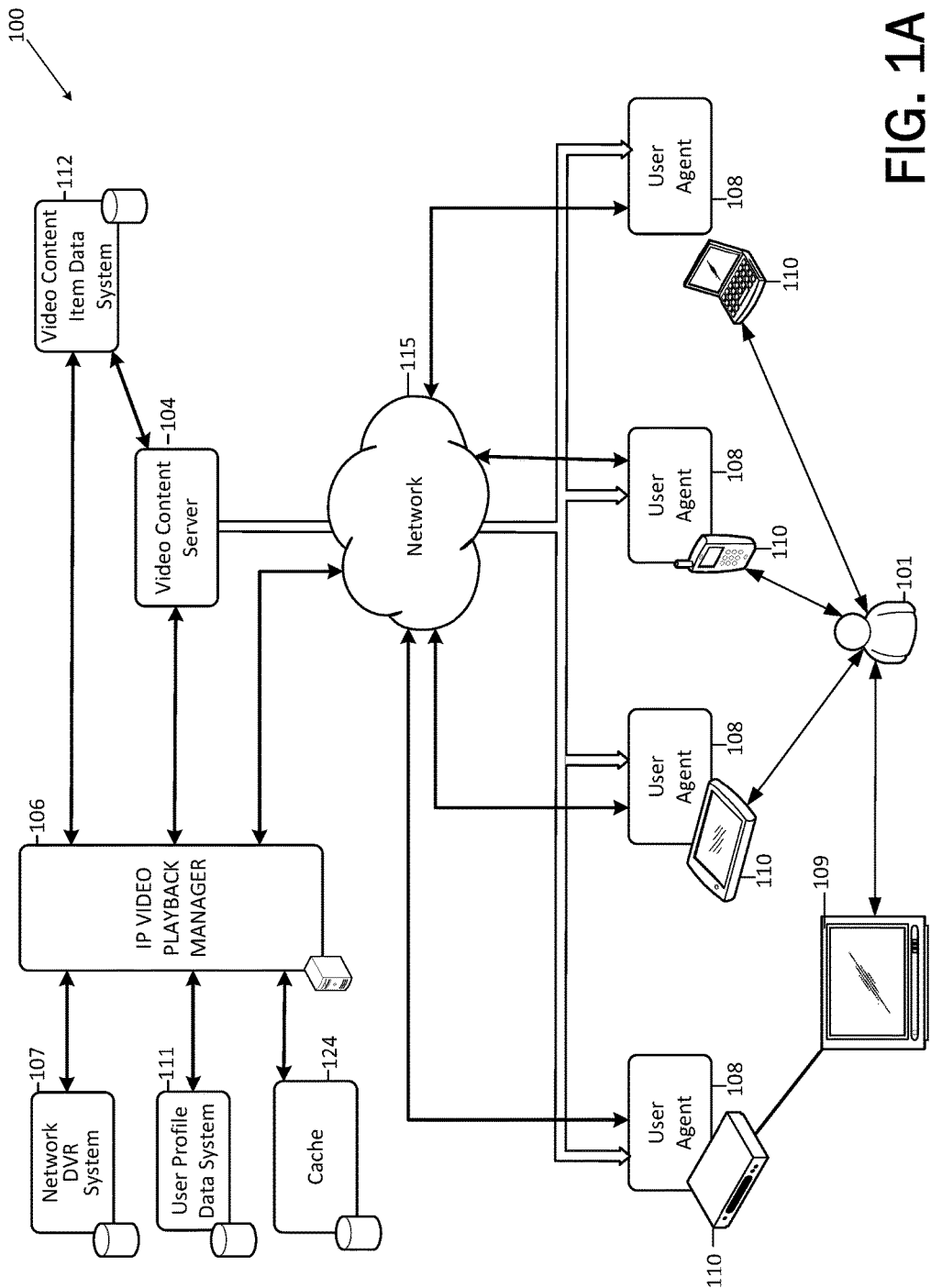
FIG. 1A is a block diagram of an aspect of a system for providing IP video playback.

As briefly described above, aspects of the present disclosure provide for quicker display and better user experience when accessing content from an endpoint device. The aspects of the present disclosure expedite the provision of content items and allow a content service provider to provide users quicker access to and display of the requested content items for a better user experience during IP video playback.

In one aspect, when a user requests access to a content item via an endpoint device operable to be provided with IP video playback, instead of downloading the entire first segment the series of sequential segments comprising the requested content item, an analysis is performed to calculate the shortest length of time in which a portion of the content item can be downloaded, cached, and displayed and the corresponding size of that portion. The analysis is based on various parameters in various aspects such as: download speed, size of the content item, processing speed of the requesting endpoint device, screen size of the requesting endpoint device, resolution of the content item, etc. Once the analysis is performed and the portion is downloaded, playback may begin and the process may be repeated as necessary until a standard portion size is reached, all of the content item has been downloaded, or another content item is requested.

These aspects may be combined, other aspects may be used, and structural changes may be made without departing from the spirit or scope of the present disclosure. The following detailed description is therefore not to be taken in a limiting sense, and the scope of the present disclosure is defined by the appended claims and their equivalents. Referring now to the drawings, in which like numerals refer to like elements throughout the several figures, aspects of the present disclosure and an exemplary operating environment will be described.

FIG. 1A is a block diagram of an aspect of a system 100 for providing IP video playback. The IP video playback system 100 allows a video content provider to provide quicker access to the requested content item to an endpoint device 110. Examples of video service providers include providers of video programming, such as, but not limited to, multiple system operators, cable television (CATV) services system operators, direct-to-home (DTH) or direct broadcast satellite (DBS) operators (i.e., satellite system operators), terrestrial (i.e., over-the-air) broadcast system operators (e.g., networks and stations), Internet protocol television (IPTV) system operators, Internet television system operators, and Internet service providers.

Components of the IP video playback system 100 may operate as a distributed system where each component is accessed via a suitable network, or various components of the system 100 may operate together as an integrated system. As illustrated, the IP video playback system 100 includes an IP video playback manager 106 in communication with a video content server 104. The video content server 104 streams video content items to customer endpoint devices 110 over a network 115. Networks suitable for use with the IP video playback system 100 include, but are not limited to, one or more of a television service provider content delivery network, the Internet, a wide area network, and a local area network. Examples of suitable endpoint devices 110 include, but are not limited to, digital set-top boxes (STBs), personal computers, tablet computing devices, smart phones, smart televisions, digital media players, and game consoles. A user agent 108 running on the endpoint device 110 receives the content stream and renders the content item on a display associated with the endpoint device 110, such as a television set 109 or an integrated screen.

Content items include live and pre-recorded programs streamed as linear programming (e.g., the program lineup on a particular channel). Content items also encompass non-linear programming from a video on-demand system. The IP video playback manager 106 according to some aspects is in communication with one or more data systems, such as, but not limited to, a video content item data system 112, a user profile data system 111, and a network DVR system 107. In various aspects, live linear programming may be provided by the video content item data system 112 in parallel to pre-recorded programming provided by the network DVR system 107. In some aspects, the IP video playback mangers 106 may be hosted by a service provider for access by various user devices 110 as a centralized IP video playback manager 106, while in other aspects, the IP video playback manager 106 may be provided as part of an endpoint device 110.

According to an aspect, the IP video playback manager 106 is operable to analyze the requested content item based on various parameters such as download speed, size of the content item, size to playback length ratio of a segment comprising the content item, total playback time of the content item, playback time for portions of the content item, playback time for the portion of the content item stored in a buffer not yet played back, size of headers, processing speed of the requesting endpoint device 110, screen size or aspect ratio of the display associated with the requesting endpoint device 110, screen refresh rate of the display associated with the requesting endpoint device 110, native resolution of the content item, whether the content item is interleaved/interlaced or progressively scanned, etc. These parameters are communicated to the IP video playback manager 106 via the user agent 108, and stored in the user profile data system 111. Additional video service account information for the user 101 may be stored in the user profile data system 111 such as endpoint device identifiers (e.g., user's STB media access control (MAC) address, user's DVR MAC address, etc.), user entitlements, and user restrictions (e.g., parental controls). According to an aspect, the user profile data system 111 may also store information associated with the user's viewing history, demographic information, and video content preferences.

In further aspects, the IP video playback manager 106 is operable to calculate a first chunk of a first segment of the requested content item and stream the chunk to initiate a dynamic buffer, thus allowing quicker user-access on the endpoint device 110.

According to one aspect, a user agent 108, running on the endpoint device 110, receives a selective indication requesting access to a content item. The user agent 108 is operable to send that request for the content item to the IP video playback manager 106, which is in communication with the network 115.

According to various aspects, the dynamic buffer is a separate or integrated part of the user agent 108 and may be associated with the endpoint devices 110. For example, endpoint devices 110 include, but are not limited to: a mobile communication device, such as a mobile phone; a computing device, such as a desktop computer, or a laptop computer; a wireless computing device, such as a tablet computing device; and a television, such as an Internet-connected television or a television connected to a network-connected consumer electronic device.

The IP video playback system 100 includes a cache 124 operable to store various types of information. For example, for a given session, data relating to a user's consumption patterns are temporarily stored in the cache 124 for use by the IP video playback manager 106 before the data is stored in the user profile data system 111. Optional index data system (not illustrated), or a recommendation system (not illustrated) may also be communicated with the IP video playback manager 106 to use the user's consumption patterns. The cache 124 is illustrated in FIG. 1A as a remote element, but may be integrated with the IP video playback manager 106.

According to some aspects, the IP video playback manager 106 may be a software application having sufficient computer executable instructions for performing the functions described herein. The IP video playback manager 106 may operate as part of a video content service provider system or as a standalone application or service that may be called on by any service or content service provider system that can communicate over the network 115 for providing the functionality described herein.

As another example, if the user 101 selects to access a content item recorded on a network DVR system 107, the IP video playback manager 106 is operable to access the content item from the user's network DVR system 107, perform the analysis and send the video content item for display on an endpoint device 110. The recorded content is stored in a network-based data store network DVR system 107 and accessible via various endpoint devices 110.

Figure 1B:
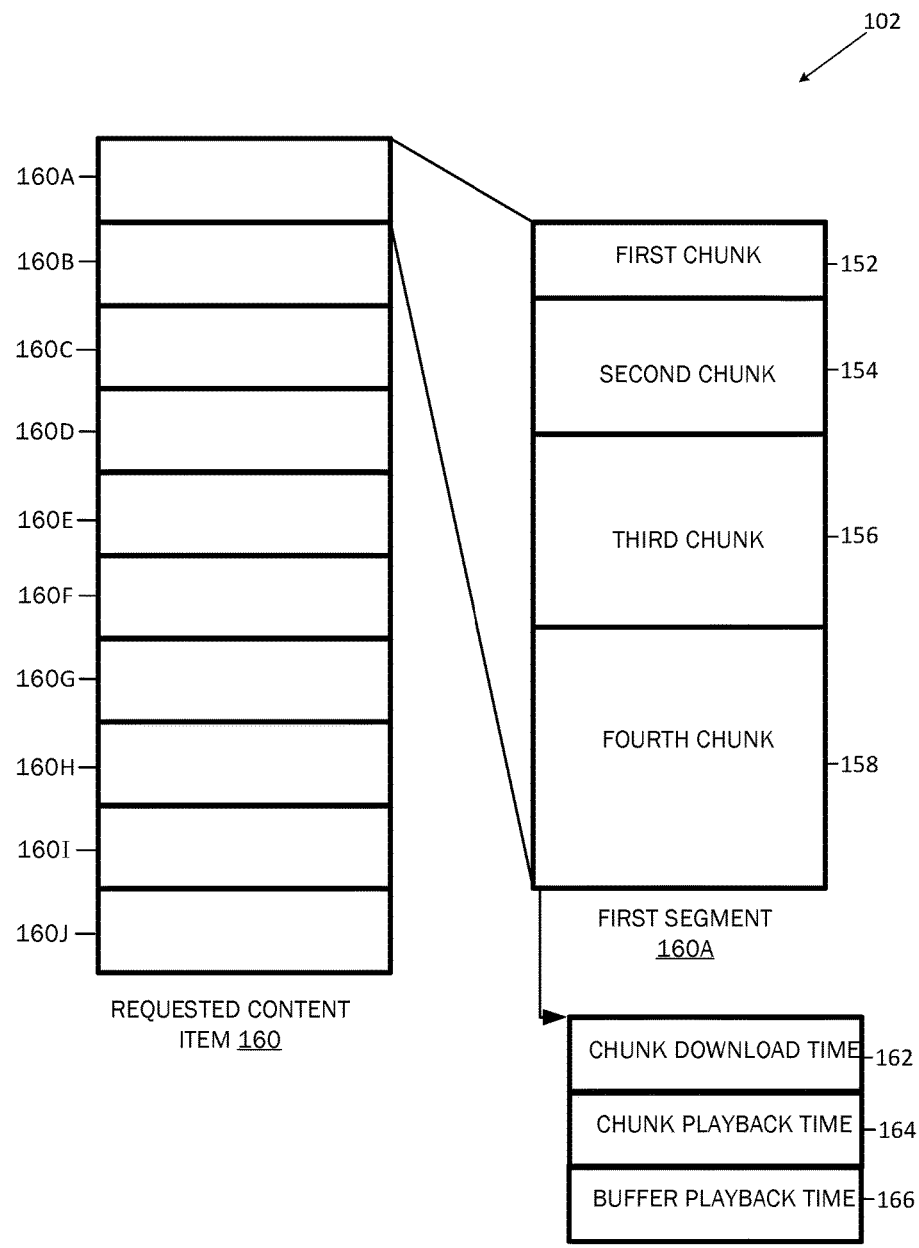
FIG. 1B is a block diagram of an aspect of providing IP video playback.

FIG. 1B is a block diagram of an example aspect 102 for providing IP video playback. As illustrated in FIG. 1B, a requested content item 160 comprises ten video segments 160A, 160B . . . 160J. When a user 101 selectively requests to access the requested content item 160, according to aspects of the IP video playback system 100, the first segment 160A of the requested content item 160 is divided such that the size of the first chunk 152 corresponds with the smallest portion of content that is calculated to have a longer playback time 164 than download time 162. As will be readily understood, a playback time 164 corresponds to the time to play back content conveyed in a chunk or segment, or held in a buffer or cache, and a download time corresponds to the time to stream and process a chunk or segment to be provided. Once the first chunk 152 is downloaded, it is provided via the endpoint device 110.

While the first chunk 152 is being provided on the endpoint device 110, the IP video playback system 100 calculates and acquires the second chunk 154. According to some aspects, the second chunk 154 is a larger portion of the first segment 160A than the first chunk 152 is. In some aspects, because the first chunk 152 takes a longer time to play back on the endpoint device 110 than to download, a correspondingly longer time is available (while the first chunk 152 is being played back) to download additional portions of the first segment 160A to comprise the second chunk 154. Accordingly, the next or subsequent chunks comprise larger portions of the requested content item 160 than the prior chunks (e.g., third chunk 156 and fourth chunk 158) are calculated, downloaded, and played back. The growing chunks dynamically expand and fill a buffer from which portions of requested content item 160 are seamlessly provided for playback on the endpoint device 110. Once the dynamic buffer is sufficiently large, such that a next segment (e.g., the second segment 160B) of the requested content item 160 can be downloaded in its entirety before the contents of the dynamic buffer are exhausted (e.g., when the buffer playback time 166 is longer than the segment download time), the IP video playback system 100 will then cease dividing segments into chunks and will provide entire segments until the user 101 chooses to switch to a new content item or the buffer is otherwise cleared or exhausted.

Alternatively, according to other aspects, the first segment 160A of the requested content item 160 is divided such that the size of the last chunk 158 in the series of sequential chunks 152, 154, 156, 158 corresponds with the portion of content that is calculated to have a shortest playback time during which second segment 160B can be downloaded in full. The preceding chunks 152, 154, 156 are then calculated so that each has a download time 162 and a playback time 164 operable to allow for the download and seamless display of the subsequent chunk.

According to other aspects, the requested content item 160 contains more or fewer than ten segments, which are larger or smaller than the segments 160A, 160B . . . 160J described above. Similarly, the number of chunks in various aspects can vary from the four chunks 152, 154, 156, 158 described above.

Figure 1C:
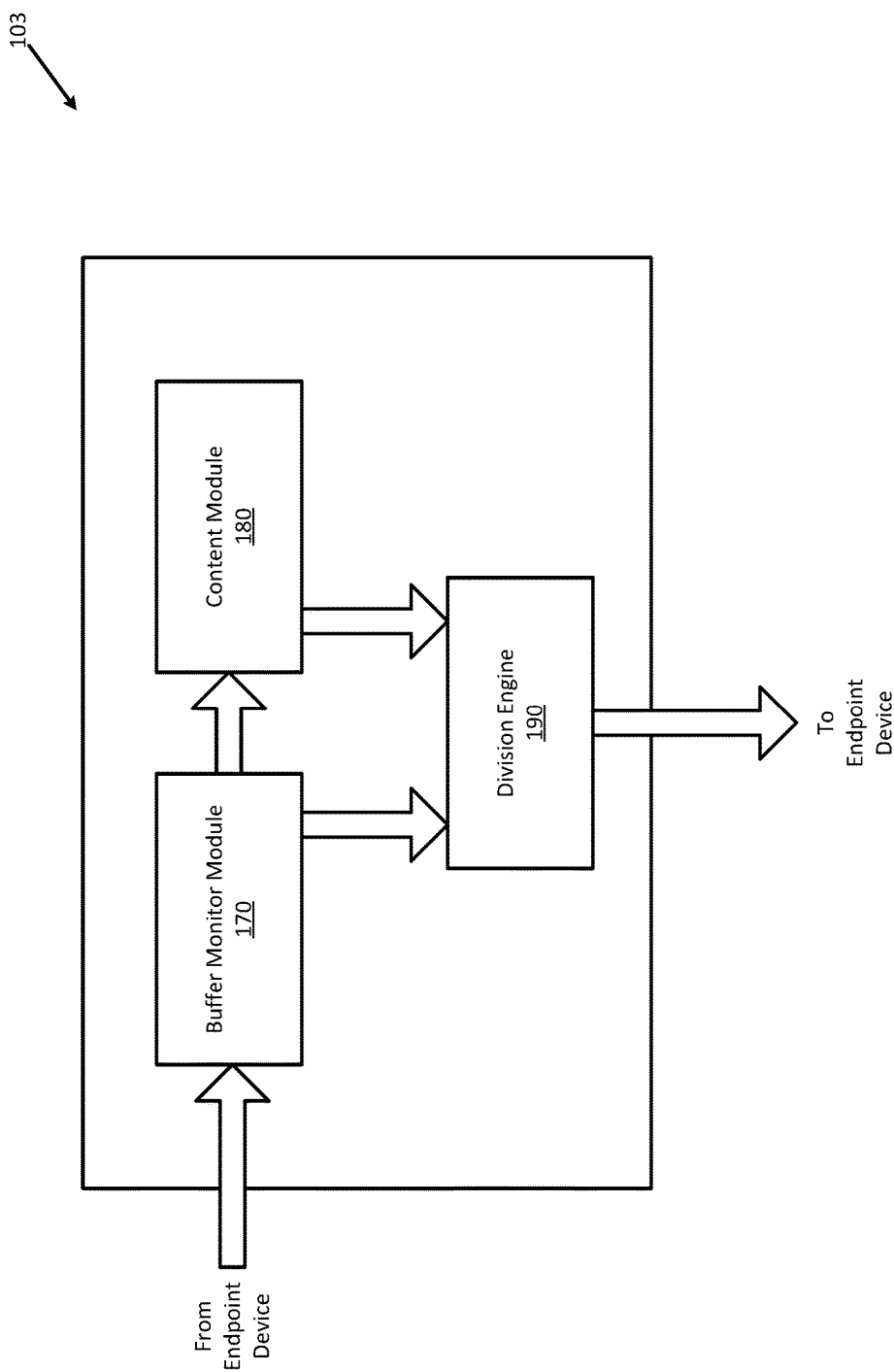
FIG. 1C is a block diagram of an aspect of a system providing improved IP video playback.

FIG. 1C is a block diagram of an aspect of a system 103 providing improved IP video playback. The system 103 monitors the buffer or cache of an endpoint device 110 and other parameters associated with the endpoint device 110 and network 115 via buffer monitor module 170. Content items and parameters associated with content items are provisioned by the content module 180 to the division engine 190. The division engine 190 is operable to analyze the parameters passed by the buffer monitor module 170 and the content module 180 to calculate how and whether to divide segments of a content item and to determine how the content item is to be transmitted to the endpoint device 110.

The buffer monitor module 170 is operable to retrieve and monitor parameters related to an endpoint device 110 and network 115 and receive an indication that a cache or buffer on the endpoint device 110 has been cleared, such as when a request to switch content items is made, or the cache has otherwise been exhausted, such as when the content item was not streamed fast enough to the endpoint device 110. One skilled in the art will understand that parameters associated with the endpoint device 110 and the network 115 include, but are not limited to: device/network processing speed, associated display aspect ratio, playback speed, download speed, available buffer size, and device ping/network lag. The buffer monitor module 170 is also operable to communicate an indication that a request has been made to switch content items to the content module 180.

The content module 180 is operable to provide content items and parameters related to the content items to the division engine 190 so that content items can be streamed to the endpoint device 110. One skilled in the art will understand that parameters related to the content item include, but are not limited to: native resolution of the content item, whether the content item is interlaced/interleaved or progressively scanned, encryption/decryption requirements, header information size, compression/decompression requirements, error correction schemes, and metadata/data distribution within the content item.

The division engine 190 is operable to receive a content item and, based on the received parameters, calculate how to divide the segment to allow for seamless playback, to divide the segment according to the calculations, and to provide the chunks to an endpoint device 110. In various aspects, calculations on how to divide the segment may be passed to the division engine 190 from the endpoint device 110. As will be understood, various aspects of the division engine 190 use different parameters given different weights in different division schemes. As one skilled in the art will also understand, in addition to breaking the segment into chunks, division includes post-processing to allow for the delivery, ordering, and appending of chunks to display the divided content item including, but not limited to: encrypting/decrypting, adding/stripping header information, adding/stripping metadata, etc., in relation to the segment and the chunks comprising the segment. Another aspect of the division engine 190 is that it is operable to create a chunk comprising portions taken from multiple segments, e.g., the last portion of a first segment 160A and the first portion of a second segment 160B may comprise a single chunk.

The division engine 190 is also operable to pass a segment of a content item from the content module 180 to a video player of an endpoint device 110 without division, such as when no indication of a request for a content item has been received or when division has yielded a block of time that allows the endpoint device 110 to download an undivided segment for display without pause or buffering in the ongoing playback of a content item (i.e., seamless playback). As is understood by those skilled in the art, a user switching content items, a service provider switching content items (e.g., emergency broadcasts, overtime coverage for sporting events, etc.), network outages, power failures, and the like are interruptions to playback that may result in a break of playback, but are not a break in ongoing playback, as the streaming of the content item is no longer ongoing; the content item has been superseded or cancelled in playback.

The aspects of the division engine 190 allow for access speed or bandwidth use to be prioritized in different situations. To prioritize access speed, the division engine 190 is operable to provide first chunks 152 with shorter download times. Because aspects of the division engine 190 allow for isolating header information (e.g., recipient information, content identification information, sender information) from a segment and integrating that header information with divided content to form each chunk, the division engine 190 is operable to use the parameters passed to it to determine a shortest download time that is still capable of conveying a portion of a content item with a playback time 164 greater than its download time 162, not merely a chunk with the shortest playback time.

Aspects of the division engine 190 that prioritize bandwidth provide a lower number of chunks. By lowering the number of chunks, a greater ratio for content::header information can be realized. In one example, the division engine 190 minimizes the number of chunks by sizing each subsequent chunk relative to the preceding chunk such that the download time 162 of the subsequent chunk is substantially equal to, but not greater than, the playback time 164 of the preceding chunk. As one skilled in the art will understand, a download time 162 that is substantially equal to a playback time 164 is one that provides for the streaming and processing of the subsequent chunk to be complete for playback before the preceding chunk has completed its playback within a margin of error as small as allowable in a given system.

By matching a subsequent download time to a preceding playback time, the division engine 190, in some situations, may be left with a last chunk of a segment that is smaller than its preceding chunk. Aspects of the division engine 190 allow it to generate chunks that do not have longer playback times than download times or that are smaller than preceding chunks when it is determined that the buffer playback time 166 will be sufficiently long to not be exhausted while providing the series of sequential chunks. Other aspects allow for a chunk to be transmitted with a segment, such that, for example, a last chunk (e.g., fourth chunk 158) comprising an end portion of a first segment 160A is streamed with all of a second segment 160B. Aspects also allow for a chunk to comprise portions of multiple segments.

Figure 2:
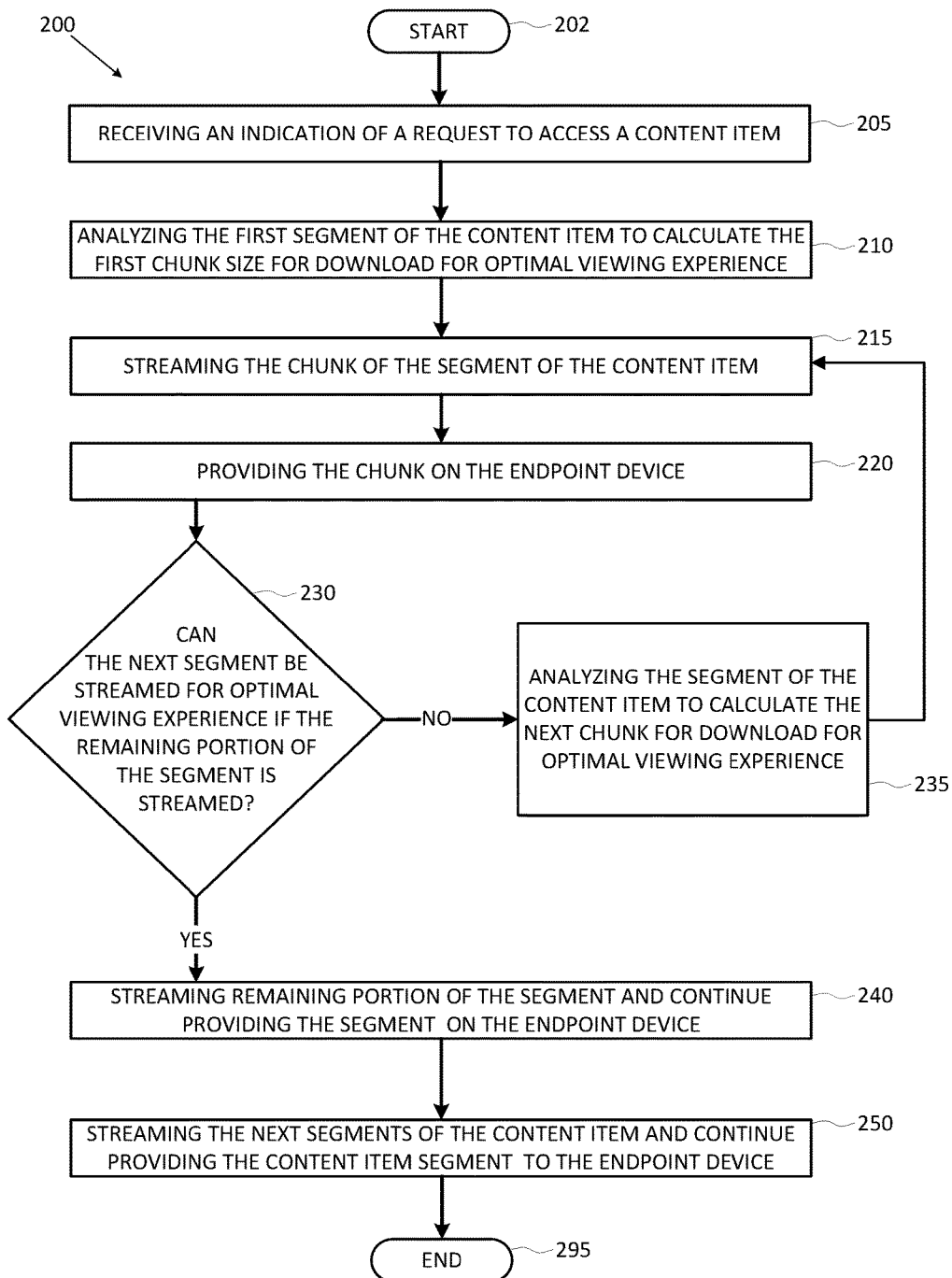
FIG. 2 is a flow chart of a method for providing access to the requested content item from an endpoint device, according to an aspect.

FIG. 2 is a flow chart of a method 200 for providing access to the requested content item 160 to an endpoint device 110, according to an aspect. The method 200 starts at OPERATION 202 and proceeds to OPERATION 205, where the IP video playback system 100 receives an indication of a request to access a content item 160 via a user agent 108 from an endpoint device 110.

The method 200 proceeds to OPERATION 210 where an analysis of the requested content item 160 takes place to calculate the size of first chunk 152 of the first segment 160A of requested content item 160, which is sized in some aspects such that its playback time is longer than its time to download. The analysis is based on various parameters described above. In some aspects, the size of the first chunk 152 corresponds to the shortest playback time 164 that exceeds the associated download time 162. In other aspects, the size of the first chunk 152 is structured to allow for the even division of a segment into a plurality of chunks, such that a last chunk 158 is large enough to allow for the seamless provision of the second segment 160B. According to yet another aspect, sizing the playback time 164 or download time 162 of the first chunk 152 includes an offset to account for variance in the parameters or in quantization of time according to a margin of error. Once the calculation is made and the first chunk 152 of the segment 160A is identified, the method 200 proceeds to OPERATION 215 where the first chunk 152 of segment 160A is downloaded by endpoint device 110 to create a dynamic buffer with an initial buffer playback time 166 corresponding to the playback time 164 of the first chunk 152.

The method 200 then proceeds to OPERATION 220 where the first chunk 152 of the segment 160A is provided on the endpoint device 110. As the requested content item 160 is provided, the buffer playback time 166 is correspondingly reduced. While the content item 160 is being provided on the endpoint device 110, the requested content item 160 is analyzed at DECISION OPERATION 230 to determine whether the contents of the dynamic buffer are sufficient to allow the download of the remaining portion or chunks of the segment 160A so that the next segment 160B can be downloaded and processed without altering the optimal viewing experience. One example of altering the optimal viewing experience is when buffering occurs, such as when the dynamic buffer is exhausted (e.g., the buffer playback time 166 is reduced to nothing, reduced below a playback/processing threshold, etc.), and the seamless playback of requested content item 160 is interrupted. Another example of altering the optimal viewing experience is when a parameter, such as the resolution of the requested content item 160, is altered to maintain the seamless playback of requested content item 160.

When the contents of the dynamic buffer are determined to be insufficient to stream the next segment, method 200 proceeds to OPERATION 235 to calculate the size of the next chunk 154 so that it can be downloaded and processed to be ready for playback in less time than it takes to play back the first chunk 152 or otherwise exhaust the contents of the dynamic buffer. Method 200 then returns to OPERATION 215 to stream the chunk for provision to the endpoint device 110. For example, after downloading the second chunk 154, if the analysis is performed and it is determined that the remaining portion (e.g., chunk 156 and chunk 158 combined) cannot be downloaded in less time than it takes to play back the contents of the dynamic buffer, then the method 200 would proceed to OPERATION 235 to calculate the next chunk, e.g., third chunk 156, to be streamed and provided according to OPERATION 215 and OPERATION 220. The method 200 is operable to loop through OPERATIONS 215-235 until it is determined at DECISION OPERATION 230 that the contents of the dynamic buffer are sufficient to stream the next segment without altering the optimal viewing experience.

When, at DECISION OPERATION 230, a determination is made that the remaining portion of the first segment 160A of the requested content item 160 can be downloaded without altering the optimal viewing experience, for example, if the download time for the remaining portion of the first segment 160A (e.g., chunk 156 and chunk 158 combined) is less than the playback time of the contents of the dynamic buffer, the method 200 proceeds to OPERATION 240 where the remaining portion of the first segment 160A of the requested content item 160 is streamed to and provided on the endpoint device 110.

The method 200 proceeds to OPERATION 250 where the next segments 160B, 160C . . . 160J are streamed to and provided on the endpoint device 110.

The method 200 ends at OPERATION 295.

Figure 3:
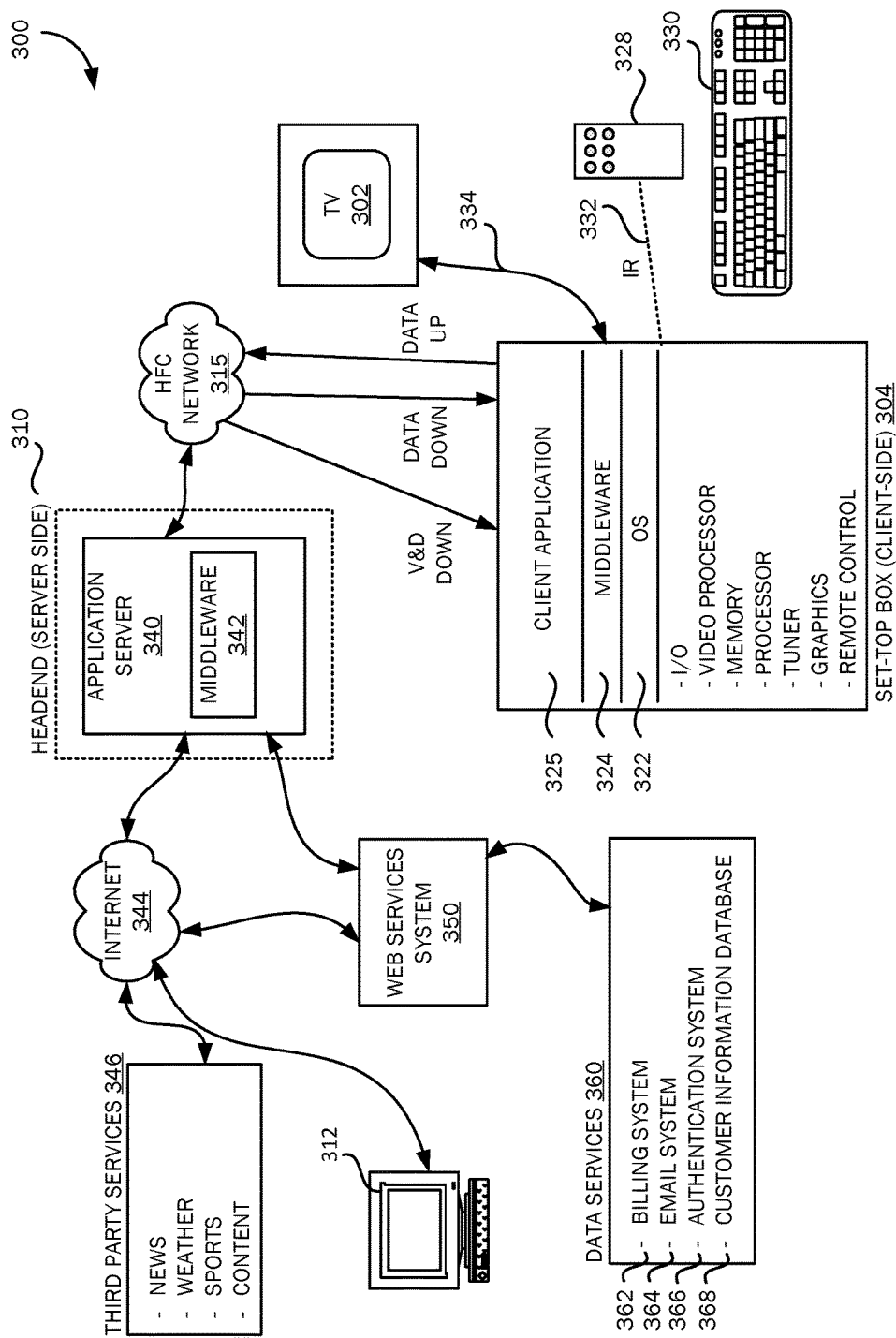
FIG. 3 is a block diagram illustrating a cable television services architecture operating environment with which aspects may be practiced.

FIG. 3 is a block diagram illustrating a CATV architecture 300 providing an operating environment according to an aspect. As can be appreciated, a CATV architecture 300 is but one of various types of systems that may be used to provide an operating environment according to one aspect. Referring now to FIG. 3, digital and analog video programming, information content, and interactive television services are provided via a hybrid fiber coax (HFC) network 315 to a television set 302 for consumption by a CATV customer. As is known to those skilled in the art, HFC networks 315 combine both optical fiber and coaxial cable lines. Typically, optical fiber runs from the cable headend 310 on the server side to neighborhoods of subscribers. Coaxial cable runs from the optical fiber feeders to each customer or subscriber. The functionality of the HFC network 315 allows for efficient bidirectional data flow between the STB 304 and the server-side application server 340.

The CATV architecture 300 is in the form of a distributed client-server computing system for providing video and data flow across the HFC network 315 between server-side services providers (e.g., cable television/services providers) via a cable headend 310 and a client-side customer via STB 304 in communication with a customer receiving device, such as the television set 302. As is understood by those skilled in the art, modern CATV architecture 300 may provide a variety of services across the HFC network 315 including traditional digital and analog video programming, telephone services, high speed Internet access, video-on-demand, and information services.

On the client side of the CATV architecture 300, digital and analog video programming and digital and analog data are provided to the customer television set 302 via STB 304. Interactive television services that allow a customer to input data to the CATV architecture 300 likewise are provided by STB 304. As illustrated in FIG. 3, STB 304 is a multipurpose computing device having a computer processor, memory, and an input/output mechanism. The input/output mechanism receives input from server-side processes via the HFC network 315 and from customers via input devices such as the remote control device 328, keyboard 330, or other computing device 312, such as a tablet/slate computer, mobile computing device, etc. The remote control device 328 and the keyboard 330 may communicate with the STB 304 via a suitable communication transport such as the infrared connection 332. The STB 304 also includes a video processor for processing and providing digital and analog video signaling to the television set 302 via a cable communication transport 334. A multi-channel tuner is provided for processing video and data to and from the STB 304 and the cable headend 310, described below.

The STB 304 also includes an operating system 322 for directing the functions of the STB 304 in conjunction with a variety of client applications 325. For example, if a client application 325 requires a news flash from a third-party news source to be displayed on the television set 302, the operating system 322 may cause the graphics functionality and video processor of the STB 304, for example, to output the news flash to the television set 302 at the direction of the client application 325 responsible for displaying news items.

Because a variety of different operating systems 322 may be used by a variety of different brands and types of set-top boxes, a client-side middleware layer 324 may be provided to allow a given software application to be executed by a variety of different operating systems. According to an aspect, the client-side middleware layer 324 includes a set of application programming interfaces (APIs) that are exposed to client applications 325 and operating systems 322 that allow the client applications 325 to communicate with the operating systems 322 through common data calls understood via the API set. As described below, a corresponding server-side middleware layer 342 is included on the server side of the CATV architecture 300 for facilitating communication between the server-side application server 340 and the client-side STB 304. The server-side middleware layer 342 of the server-side application server 340 and the client-side middleware layer 324 of the client-side STB 304 may format data passed between the client side and server side according to the Extensible Markup Language (XML).

According to one aspect, the STB 304 passes digital and analog video and data signaling to the television set 302 via a cable communication transport 334. According to other aspects, two-way communication transports may be used, for example, via high definition multimedia interface (HDMI) ports. The STB 304 may receive video and data from the server side of the CATV architecture 300 via the HFC network 315 through a video/data downlink and data via a data downlink. The STB 304 may transmit data from the client side of the CATV architecture 300 to the server side of the CATV architecture 300 via the HFC network 315 via one data uplink. The video/data downlink is an "in-band" downlink that allows for digital and analog video and data signaling from the server side of the CATV architecture 300 through the HFC network 315 to the STB 304 for use by the STB 304 and for distribution to the television set 302. The in-band signaling space operates in a specified frequency range that is generally divided into channels. Each channel may carry one or more signals, for example, a single analog signal or multiple digital signals.

The data downlink and the data uplink, illustrated in FIG. 3, between the HFC network 315 and the STB 304 comprise "out-of-band" data links. The out-of-band frequency range is generally lower than the frequency range used for in-band signaling. Data flow between the client-side STB 304 and the server-side application server 340 is typically passed through the out-of-band data links. Alternatively, an in-band data carousel may be positioned in an in-band channel into which a data feed may be processed from the server-side application server 340 through the HFC network 315 to the client-side STB 304. Operation of data transport between components of the CATV architecture 300 is well known to those skilled in the art.

Referring still to FIG. 3, the cable headend 310 of the CATV architecture 300 is positioned on the server side of the CATV architecture 300 and includes hardware and software systems responsible for originating and managing content for distributing through the HFC network 315 to client-side STBs 304 for presentation to customers via television sets 302. As described above, a number of services may be provided by the CATV architecture 300, including digital and analog video programming, interactive television services, telephone services, video-on-demand services, targeted advertising, and provision of information content.

The server-side application server 340 is a computing system operative to assemble and manage data sent to and received from the client-side STB 304 via the HFC network 315. As described above with reference to the STB 304, the server-side application server 340 includes a server-side middleware layer 342 for processing and preparing data from the cable headend 310 of the CATV architecture 300 for receipt and use by the client-side STB 304. For example, the server-side application server 340 via the server-side middleware layer 342 may obtain data from third-party services 346 via the Internet 344 for transmitting to a customer through the HFC network 315 and the STB 304. For example, content data and metadata of a third-party service 346 may be downloaded by the server-side application server 340 via the Internet 344. When the server-side application server 340 receives the downloaded third-party services 346, the server-side middleware layer 342 may be used to format the content data and metadata for receipt and use by the STB 304. Therefore, content data and metadata may be sent and categorized based on the availability to the customer's program guide data.

According to one aspect, data obtained and managed by the server-side middleware layer 342 of the server-side application server 340 is formatted according to the Extensible Markup Language (XML) and is passed to the STB 304 through the HFC network 315 where the XML-formatted data may be used by a client application 325 in concert with the client-side middleware layer 324, as described above. As should be appreciated by those skilled in the art, a variety of data from third-party services 346, including news data, weather data, sports data and other information content may be obtained by the server-side application server 340 via distributed computing environments such as the Internet 344 for provision to customers via the HFC network 315 and the STB 304. According to some aspects, client application 325 includes the user agent 108 described herein.

According to some aspects, the server-side application server 340 obtains customer support services data, including billing data, information on customer work order status, answers to frequently asked questions, services provider contact information, and the like from data services systems 360 for provision to the customer via an interactive television session. As illustrated in FIG. 3, the services provider data services systems 360 include a number of services operated by the services provider of the CATV architecture 300, which may include data on a given customer.

A billing system 362 may include information such as a customer's name, street address, business identification number, Social Security number, credit history, and information regarding services and products subscribed to by the customer. According to some aspects, the billing system 362 also includes billing data for services and products subscribed to by the customer for bill processing, billing presentment, and payment receipt.

An email system 364 may include information such as user accounts, usernames, address books, archived messages, subscriber profiles, subscriber IDs, and passwords used by customers for access to electronic mail services.

An authentication system 366 may include information such as secure user names, subscriber profiles, subscriber IDs, and passwords used by customers for access to network services.

A customer information database 368 may include general information about customers such as place of employment, business address, business telephone number, and demographic information such as age, gender, educational level, and the like. The customer information database 368 may also include information on pending work orders for services or products ordered by the customer. The customer information database 368 may also include general customer information such as answers to frequently asked customer questions and contact information for various service provider offices/departments. As should be understood, this information may be stored in a variety of disparate databases operated by the cable services provider.

As should be understood by those skilled in the art, the disparate systems 362, 364, 366, 368 may be integrated or provided in any combination of separate systems, of which FIG. 3 only illustrates one example.

Referring still to FIG. 3, web services system 350 is illustrated between the server-side application server 340 and the data services systems 360. A web services system 350 serves as a collection point for data requested from the disparate systems 362, 364, 366, 368 comprising data services systems 360. According to aspects, when the server-side application server 340 requires customer services data from one or more of the data services, the server-side application server 340 passes a data query to the web services system 350. The web services system 350 formulates a data query to each of the available data services systems 360 for obtaining any required data for a requesting customer as identified by an STB-identification associated with the customer. The web services system 350 serves as an abstraction layer between the various data services systems 360 and the server-side application server 340. That is, the server-side application server 340 is not required to communicate with the disparate data services systems 360, nor is the server-side application server 340 required to understand the data structures or data types used by the disparate data services systems 360. The web services system 350 is operative to communicate with each of the disparate data services systems 360 for obtaining necessary customer data. The customer data obtained by the web services system 350 is assembled and is returned to the server-side application server 340 for ultimate processing via the server-side middleware layer 342, as described above.

Figure 4:
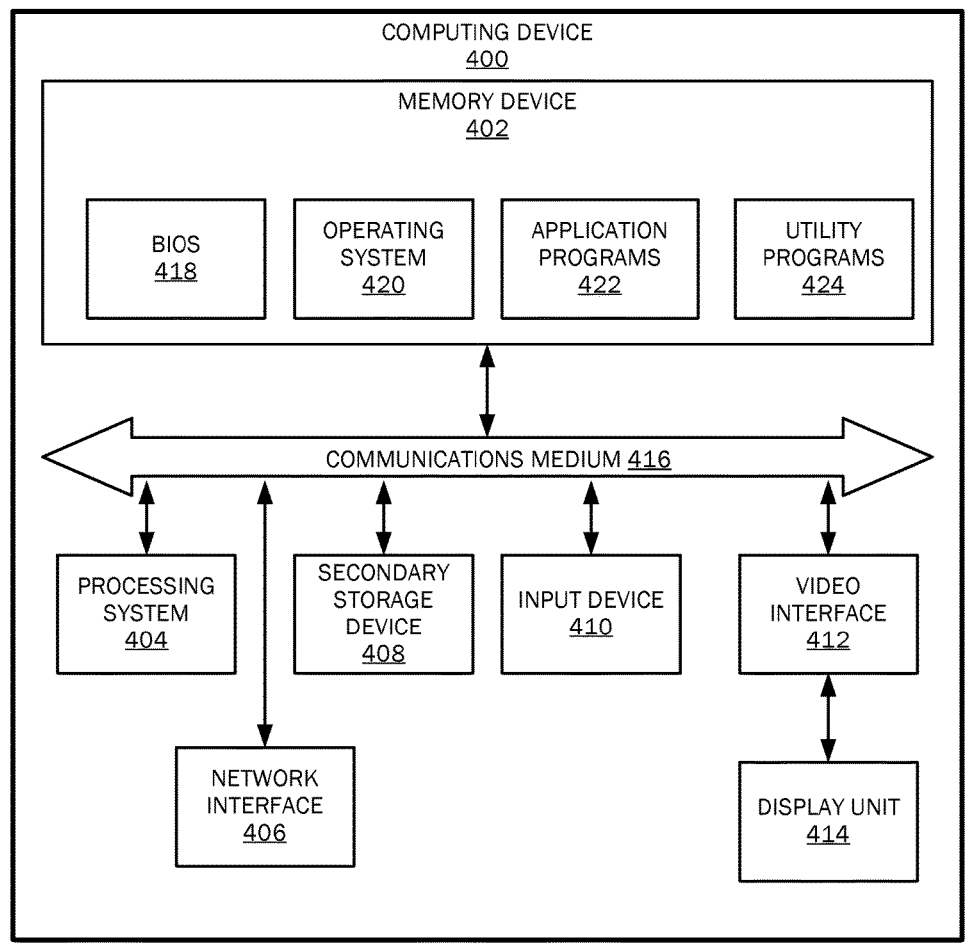
FIG. 4 is a block diagram illustrating example physical components of a computing device with which aspects may be practiced.

FIG. 4 is a block diagram illustrating example physical components of a computing device 400 with which aspects of the IP video playback system 100 may be practiced. In some aspects, one or more of the components of IP video playback system 100 may be implemented using one or more computing devices like the computing device 400. It should be appreciated that in other aspects, one or a combination of the components of IP video playback system 100 may be implemented using computing devices having hardware components other than those illustrated in FIG. 4.

Computing devices may be implemented in different ways in different aspects. For instance, in the aspect illustrated in FIG. 4, the computing device 400 includes a processing system 404, memory device 402, a network interface 406, a secondary storage device 408, an input device 410, a video interface 412, a display unit 414, and a communications medium 416. In other aspects, the computing device 400 may be implemented using more or fewer hardware components (e.g., a video interface, a display unit, or an input device) or in combination with other types of computer systems and program modules.

The memory device 402 includes one or more computer-readable storage media capable of storing data or computer-executable instructions. Memory device 402 thus may store the computer executable instructions that, when executed by processing system 404, provide improved IP Video Playback, as described above with reference to FIGS. 1-2. In various aspects, the memory device 402 is implemented in various ways. For example. The memory device 402 can be implemented as various types of computer-readable storage media. Example types of computer-readable storage media include, but are not limited to: solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices or articles of manufacture that store data.

The term computer-readable media includes transmission media and computer-readable storage media. Transmission media includes communication and information delivery media. Computer-executable instructions, data structures, and program modules may be carried via a transmission medium. For example, transmission media can include wired media, such as a wired network or direct-wired connection, and wireless media, such as acoustic, radio frequency (RF), infrared, and other wireless media.

The term computer-readable storage medium (and its plural: computer-readable storage media) refers only to devices and articles of manufacture that store data or computer-executable instructions readable by a computing device. The term computer-readable storage medium does not include transmission media. The term computer-readable storage medium encompasses volatile and nonvolatile and removable and non-removable media implemented in various methods or technologies for storage and retrieval of information. Such information can include data structures, program modules, computer-executable instruction, and other data.

The secondary storage device 408 includes one or more computer-readable storage media, and may store data and computer-executable instructions not directly accessible by the processing system 404. That is, the processing system 404 performs an I/O operation to retrieve data or computer-executable instruction from the secondary storage device 408. In various examples, the secondary storage device 408 can be implemented as various types of computer-readable storage media such as: magnetic disks, magnetic tape drives, CD-ROM disks, DVD-ROM disks, BLU-RAY disks, solid state memory devices, or other types of computer-readable storage media.

The processing system 404 includes one or more processing units, which may include tangible integrated circuits that selectively execute computer-executable instructions. In various aspects, the processing units in the processing system 404 are implemented in various ways. For example, the processing units in the processing system 404 can be implemented as one or more processing cores. In another example, the processing system 404 can comprise one or more separate microprocessors. In yet another example, the processing system 404 can comprise Application-Specific Integrated Circuits (ASICs) that provide specific functionality. In yet another example, the processing system 404 provides specific functionality by using an ASIC and by executing computer-executable instructions.

The computing device 400 may be enabled to send data to and receive data from a communication network via a network interface 406. In different aspects, the network interface 406 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The input device 410 enables the computing device 400 to receive input from a user 101. Example types of input devices include, but are not limited to: keyboards, mice, trackballs, stylus input devices, keypads, microphones, joysticks, touch-sensitive display screens, and other types of devices that provide user input to the computing device 400.

The video interface 412 outputs video information to the display unit 414. In different aspects, the video interface 412 is implemented in different ways. For example, the video interface 412 is a video expansion card. In another example, the video interface 412 is integrated into a motherboard of the computing device 400. In various aspects, the display unit 414 can be a an LCD display panel, a touch-sensitive display panel, an LED screen, a projector, a cathode-ray tube display, or another type of display unit. In various aspects, the video interface 412 communicates with the display unit 414 in various ways. For example, the video interface 412 can communicate with the display unit 414 via a Universal Serial Bus (USB) connector, a VGA connector, a digital visual interface (DVI) connector, an S-Video connector, an HDMI connector, a DisplayPort connector, or another type of connection.

The communications medium 416 facilitates communication among the hardware components of the computing device 400. In different aspects, the communications medium 416 facilitates communication among different components of the computing device 400. For instance, in the aspect illustrated in FIG. 4, the communications medium 416 facilitates communication among the memory device 402, the processing system 404, the network interface 406, the secondary storage device 408, the input device 410, and the video interface 412. In different aspects, the communications medium 416 is implemented in different ways, such as a PCI bus, a PCI Express bus, an AcceleratedGraphics Port (AGP) bus, an InfiniBand interconnect, a serial Advanced Technology Attachment (ATA) interconnect, a parallel ATA interconnect, a Fiber Channel interconnect, a USB bus, a Small Computer System Interface (SCSI), or another type of transmission medium.

The memory device 402 stores various types of data or software instructions. For instance, in the example illustrated in FIG. 4, the memory device 402 stores a Basic Input/Output System (BIOS) 418, and an operating system 420. The BIOS 418 includes a set of software instructions that, when executed by the processing system 404, cause the computing device 400 to boot up. The operating system 420 includes a set of software instructions that, when executed by the processing system 404, cause the computing device 400 to provide an operating system that coordinates the activities and sharing of resources of the computing device 400. The memory device 402 also stores one or more application programs 422 that, when executed by the processing system 404, cause the computing device 400 to provide applications to users. The memory device 402 also stores one or more utility programs 424 that, when executed by the processing system 404, cause the computing device 400 to provide utilities to other software programs.

Aspects of the present disclosure may be used in various distributed computing environments where tasks are performed by remote processing devices that are linked through a communications network in a distributed computing environment.

Figures 5A, 5B:
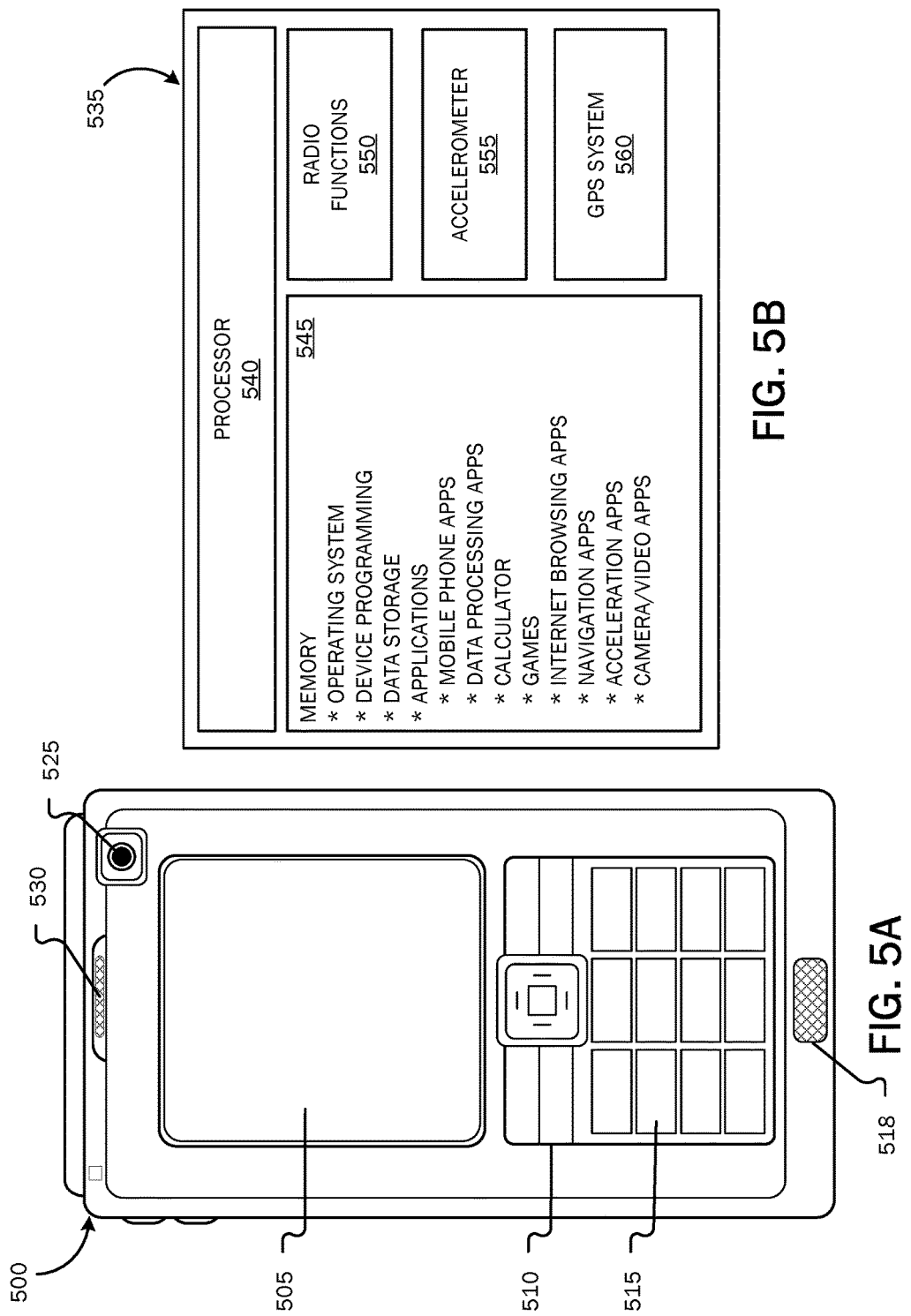
FIGS. 5A-B illustrate a suitable mobile computing environment with which aspects may be practiced.

FIGS. 5A and 5B illustrate a suitable mobile computing environment, for example, a mobile computing device 500, a smart phone, a laptop computer, a tablet personal computer, and the like, with which aspects may be practiced. The mobile computing device 500 is illustrative of any suitable device operative to send, receive, and process wireless communications according to aspects of the present disclosure. A display screen 505 is operative for displaying a variety of information such as information about incoming and outgoing communications, as well as, a variety of data and displayable objects, for example, text, alphanumeric data, photographs, and the like.

Data input to the mobile computing device 500 may be performed via a variety of suitable means, such as, touch screen input via the display screen 505, keyboard or keypad input via a data entry area 510, key input via one or more selectable buttons or controls 515, voice input via a microphone 518 disposed on the mobile computing device 500, photographic input via a camera 525 functionality associated with the mobile computing device 500, or any other suitable input means. Data may be output via the mobile computing device 500 via any suitable output means, including but not limited to, display on the display screen 505, audible output via an associated speaker 530 or connected earphone system, vibration module for providing tactile output, and the like.

Referring now to FIG. 5B, operational unit 535 is illustrative of internal operating functionality of the mobile computing device 500. A processor 540 is illustrative of a general purpose computer processor for processing incoming and outgoing data and communications and controlling operation of the device and associated software applications via a mobile computing device operating system. Memory 545 may be used for storing a device operating system, device programming, one or more stored applications, for example, mobile telephone applications, data processing applications, calculators, games, Internet browsing applications, navigation applications, acceleration applications, camera or video applications, etc. According to one aspect, the client application 325 is stored locally on mobile computing device 500.

Mobile computing device 500 may contain an accelerometer 555 for detecting acceleration, and to sense orientation, vibration, or shock. Mobile computing device 500 may contain a global positioning system (GPS) system (e.g., GPS send/receive functionality) 560. A GPS system 560 uses radio waves to communicate with satellites orbiting the Earth. Some GPS-enabled mobile computing devices 500 use wireless-assisted GPS to determine a user's location, wherein the mobile computing device 500 uses orbiting GPS satellites in conjunction with information about the mobile computing device's 500 mobile phone signal. Radio functions 550 include all required functionality, including onboard antennas, for allowing the mobile computing device 500 to communicate with other communication devices and systems via a wireless network. Radio functions 550 may be used to communicate with a wireless or a WI-FI positioning system to determine the location of a mobile computing device 500.

Although described herein in combination with mobile computing device 500, in alternative aspects, any number of computer systems, such as in desktop environments, laptop or notebook computer systems, multiprocessor systems, microprocessor-based or programmable customer electronics, networked PCs, mini computers, main frame computers, and the like may be used in combination. Aspects of the present disclosure may be used in various distributed computing environments where tasks are performed by remote processing devices that are linked through a communications network in a distributed computing environment, and where programs may be located in both local and remote memory storage.

Aspects, for example, are described above with reference to block diagrams or operational illustrations of methods, systems, and computer program products according to aspects. The functions/acts noted in the blocks may occur out of the order as shown in any flowchart or described herein with reference to FIGS. 1-2. For example, two processes shown or described in succession may in fact be executed substantially concurrently or the blocks may sometimes be executed in the reverse order, depending upon the functionality/acts involved.

While certain examples and aspects have been described, other examples and aspects may exist. Furthermore, although examples and aspects have been described as being associated with data stored in memory and other storage media, data may be stored on or read from other types of computer-readable storage media, such as secondary storage devices, like hard disks, floppy disks, a CD-ROM, or other forms of RAM or ROM. Further, the disclosed processes may be modified in any manner, including by reordering, inserting, deleting, or repeating a step or process, without departing from the present disclosure.

The foregoing description of the exemplary aspects of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not with this detailed description, but rather by the claims appended hereto.

We claim:

1. A method for providing Internet Protocol (IP) video, the method comprising:
    receiving a request to access a content item, wherein the content item comprises a series of sequential segments including a first segment;
    in response to receiving the request, analyzing the first segment of the series of sequential segments to calculate a series of sequential chunks to divide the first segment into for streaming;
    dividing the first segment into the series of sequential chunks, wherein each chunk of the series of sequential chunks has a download time and a playback time and a first chunk of the first segment has a shorter playback time as compared to each remaining chunk of the of the first segment;
    streaming the first chunk of the series of sequential chunks of the first segment to a dynamic buffer of an endpoint device defining to define an initial buffer playback time for the dynamic buffer that corresponds to the playback time of the first chunk of the series of sequential chunks of the first segment;
    after the first chunk of the series of sequential chunks of the first segment has been streamed to the endpoint device, streaming a second chunk of the series of sequential chunks of the first segment to the dynamic buffer of the endpoint device while enabling playback of the first chunk of the first segment from the dynamic buffer while the second chunk of the first segment is streaming to the dynamic buffer, wherein the second chunk of the first segment comprises a larger portion of the first segment as compared to the first chunk of the first segment, and the second chunk's download time is shorter than the buffer playback time and shorter than the second chunk's playback time, thereby increasing the buffer playback time; and
    cease dividing a subsequent segment into chunks when the buffer playback time is greater than or equal to a segment download time.

2. The method of claim 1, wherein dividing the first segment into the series of sequential chunks further comprises:
    isolating header information comprising the first segment from content comprising the first segment;
    dividing the content into a series of sequential content chunks; and
    adding the header information to each content chunk of the series of sequential content chunks to form each chunk.

3. The method of claim 1, further comprising, after streaming the second chunk to the endpoint device:
    determining whether the buffer playback time is greater than or equal to the segment download time;
    when the buffer playback time is greater than or equal to the segment download time, streaming a next segment of the series of sequential segments absent dividing the next segment of the series of sequential segments into chunks; and
    when the buffer playback time is less than the segment download time, dividing the next segment into a series of sequential chunks, streaming a subsequent chunk of the series of sequential chunks of the next segment, wherein the subsequent chunk's download time is shorter than the buffer playback time and shorter than the subsequent chunk's playback time, thereby increasing the buffer playback time.

4. The method of claim 3, further comprising when the buffer playback time is greater than or equal to the segment download time, wherein a remaining chunk of the first segment has not been streamed:
before streaming the next segment of the series of sequential segments, streaming the remaining chunk, wherein the remaining chunk's download time is no greater than the buffer playback time.

5. The method of claim 1, wherein the download time of a last chunk of the series of sequential chunks is longer than the playback time of the last chunk.

6. The method of claim 1, wherein the first chunk is calculated such that the download time of the first chunk is a shortest download time wherein the playback time is longer than the download time.

7. The method of claim 1, wherein the first chunk is calculated based on a last chunk, wherein the playback time of the last chunk corresponds to a segment download time.

8. The method of claim 1, wherein analyzing the first segment of the content item to calculate the first chunk for streaming is based on one or more of:
a download speed;
a size of the content item;
a size to playback length ratio of the segments of the series of sequential segments;
a processing speed of the endpoint device;
an available buffer size;
a screen size of the endpoint device; and
a native resolution of the content item.

9. The method of claim 1, wherein the download time of each subsequent chunk to the first chunk is about equal or equal to the playback time of a preceding chunk.

10. The method of claim 1, wherein a last chunk is streamed with a next segment of the series of sequential segments.

11. A system for providing improved IP video playback comprising,
a processing device;
a memory device, including computer readable instructions, which when executed by the processing device are operable to provide:
a buffer monitor module, operable to receive and process an indication of a content item request;
a content module, operable to provide a content item in response to the processed indication of a content item request, wherein the content item is comprised of a series of sequential segments including a first segment;
a division engine, operable to divide the first segment of the content item to generate a series of sequential chunks for the first segment, wherein each chunk has a download time and a playback time and a first chunk of the first segment has a shorter playback time as compared to each remaining chunk of the series of sequential chunks of the first segment, wherein each chunk's download time is shorter than the chunk's corresponding playback time, wherein the division engine streams the first chunk of the series of sequential chunks of the first segment for playback to a dynamic buffer of an endpoint device to define an initial buffer playback time for the dynamic buffer corresponding to a playback time of the first chunk of the series of sequential chunks of the first segment, wherein after the first chunk of the series of sequential chunks of the first segment has been streamed to the endpoint device,
the division engine further to:
stream a second chunk of the series of sequential chunks of the first segment to the dynamic buffer of the endpoint device while enabling playback of the first chunk of the first segment from the dynamic buffer while the second chunk of the first segment is streaming to the dynamic buffer, wherein the second chunk of the first segment comprises a larger portion of the first segment as compared to the first chunk of the first segment; and
cease division of a subsequent segment into chunks when the buffer playback time is greater than or equal to a segment download time.

12. The system of claim 11, wherein the division engine is further operable to size each chunk subsequent to the first chunk such that the download time of the subsequent chunk is about equal or equal to the playback time of a preceding chunk.

13. The system of claim 11, wherein the division engine is further operable to divide the first segment of the content item such that the first chunk of the series of sequential chunks has a download time that is a shortest download time with a corresponding longer playback time.

14. The system of claim 11, wherein the division engine is further operable to divide the first segment of the content item such that a last chunk in the series of sequential chunks has a playback time about equal or equal to a segment download time.

15. The system of claim 11, wherein the division engine is operable to divide multiple segments comprising the content item to generate at least one chunk in the series of sequential chunks that comprises a portion from the first segment and a portion from a second segment.

16. The system of claim 1, wherein the buffer monitor module is further operable to indicate the buffer playback time to the division engine:
when the buffer playback time is at least as long as a segment download time, the division engine ceases dividing segments and, in response to provisioning a last chunk of the series of sequential chunks, provision a next segment in the series of sequential segments.

17. The system of claim 11, wherein the buffer monitor module is further operable to monitor one or more parameters including:
a download speed;
a total playback time of the content item;
a buffer playback time of a portion of the content item currently stored in a buffer;
a processing speed of an endpoint device;
an endpoint device ping;
a display size associated with the endpoint device; and
a native resolution of the content item.

18. A computer-readable storage medium containing computer executable instructions, which, when executed by a computing device, perform a method for providing IP video comprising:
receiving a request for streaming a content item comprised of a series of sequential segments;
determining a segment download time;
analyzing a first segment of the series of sequential segments to calculate a series of sequential chunks to divide the first segment into for streaming;
dividing the first segment into the series of sequential chunks, wherein each chunk in the series of sequential chunks of the first segment has a download time and a playback time and a first chunk of the first segment has a shorter playback time as compared to the remaining chunks of the series of sequential chunks of the first segment, wherein a subsequent chunk of the series of sequential chunks of the first segment comprises a larger portion of the first segment as compared to the first chunk of the first segment, and each chunk's download time is shorter than the corresponding playback time;

streaming the first chunk of the series of sequential chunks of the first segment for playback to a dynamic buffer of an endpoint device to define an initial buffer playback time for the dynamic buffer that corresponds to a playback time of the first chunk of the series of sequential chunks of the first segment;

streaming each chunk of the series of sequential chunks of the first segment subsequent to the first chunk to the dynamic buffer of the endpoint device during the playback of a preceding chunk to provide seamless ongoing playback;

in response to streaming the last chunk of the series of sequential chunks of the first segment, streaming each subsequent segment of the series of sequential segments comprising the content item; and cease dividing a subsequent segment into chunks when the buffer playback time is greater than or equal to the segment download time.

19. The computer-readable storage medium of claim 18, wherein the first chunk is sized so that the download time of the first chunk is a shortest download time corresponding to a longer playback time.

20. The computer-readable storage medium of claim 18, wherein the download time of each subsequent chunk is about equal or equal to the playback time of a preceding chunk.

* * * * *